United States Patent Office 2,857,375
Patented Oct. 21, 1958

2,857,375

STREPTOMYCIN AND DIHYDROSTREPTOMYCIN SALTS AND METHOD OF RECOVERING AND PURIFYING STREPTOMYCIN AND DIHYDROSTREPTOMYCIN BY MEANS THEREOF

Fritz Ziegler, Wuppertal-Elberfeld, Germany, assignor to Schenley Industries, Inc., New York, N. Y., a corporation of Delaware No Drawing. Application March 15, 1956
Serial No. 571,617

Claims priority, application Germany March 25, 1955

7 Claims. (Cl. 260—210)

This invention relates to new and useful difficultly water-soluble salts of streptomycin and dihydrostreptomycin and to a method for recovering and purifying streptomycin and dihydrostreptomycin from their crude solutions by means thereof.

Streptomycin and dihydrostreptomycin are known to form difficultly soluble salts with higher fatty acids, such as lauric acid and oleic acid, but these salts cannot be crystallized and therefore are difficult to obtain in pure state.

It is further known that streptomycin and dihydrostreptomycin are capable of forming difficultly soluble compounds with certain dyestuffs, such as naphthol-blue-black, orange II, methyl-orange, etc., and with certain capillary active substances, which compounds have in part been proposed as intermediates in the purification of streptomycin.

It has now been found that new and useful crystallized salts of streptomycin and dihydrostreptomycin which are difficultly soluble in water can be formed either by reacting streptomycin or dihydrostreptomycin salts with salts of nuclearly substituted cresotinic acids or by reacting streptomycin or dihydrostreptomycin base with nuclearly substituted cresotinic acids in solution or in suspension. The new salts thus obtained are difficultly or very difficultly soluble in water but are easily soluble in ethanol, slightly less easily soluble in acetone and dioxane and insoluble in ligroin. The new salts may be crystallized from a mixture of ethanol and water without any change in composition.

The solubility characteristics of these new salts may be employed to advantage in the recovery and purification of streptomycin and dihydrostreptomycin from their crude solutions.

The invention is illustrated by the following non-limitative examples:

Example 1

11 grams of p-cyclohexyl-o-cresotinic acid are suspended in 60 cc. of water and then dissolved by gradual addition of 20% NaOH until a pH value of 6.5 is reached. A solution of 10.2 grams of streptomycin sulfate in 70 cc. of water is added thereto. At first a slimy precipitate is formed which upon rubbing with a glass rod or upon standing becomes crystalline. After a time it is suction filtered, washed with cold water and dried in the exsiccator. The yield of streptomycin salt of p-cyclohexyl-o-cresotinic acid amounts to 16.0–16.5 grams. The precipitate can, if desired, be further purified by dissolving it in a little methanol and washing with water.

In analogous manner, the coresponding dihydrostreptomycin salt of the cresotinic acid is obtained which crystallizes much more easily. The compounds have the composition of 1 mol of streptomycin or dihydrostreptomycin base and 3 mols of the cyclohexyl cresotinic acid.

Example 2

12 grams of p-isobutyl-o-cresotinic acid are suspended in 60 cc. of water and dissolved by the addition of 20% NaOH until a pH value of 6.5 is reached. By adding a solution of 12.8 grams of dihydrostreptomycin sulfate in 70 cc. of water, a slimy precipitate is obtained which crystallized upon rubbing with a glass rod or upon standing. After solidifying, the precipitate is suction filtered, washed with ice cold water and then dried. The yield of dihydrostreptomycin salt of p-isobutyl-o-cresotinic acid amounts to 18 grams.

The compound may, if desired, be further purified by re-crystallizing from a mixture of ethanol and water. It has the composition of 1 mol of dihydrostreptomycin base and 3 mols of p-isobutyl-o-cresotinic acid.

P-cyclohexyl-o-cresotinic acid and p-isobutyl-o-cresotinic acid are new acids not described in the literature. They were obtained from the corresponding phenols: p-cyclohexyl-o-cresotinic acid (5-cyclohexyl-3-methyl-2-hydroxybenzoic acid) is prepared from cyclohexyl-o-cresol (4-cyclohexyl-2-methyl-phenyl), the latter being obtained by hydrolyzing 5-cyclohexyl-2-amino-1-methyl benzene; p-isobutyl-o-cresotinic acid (5-isobutyl-3-methyl-2-hydroxybenzoic acid) is prepared from 4-isobutyl-2-methyl phenol by carboxylation according to Kolbe-Schmitt in the modification of Marasse (German Patent 73,279; compare also Journ. Org. Chem. 19, 510 (1954)) by treating a mixture of phenol and anhydrous potassium carbonate with carbonic acid under heat and pressure. A representative example of this synthesis is as follows:

48 grams of 4-cyclohexyl-2-methylphenol were mixed with 130 grams of desiccated potassium carbonate and introduced into an autoclave together with 90 grams of solid carbonic acid. The autoclave was heated in a bath of silicone oil having a temperature of 220–230° C. for 7 hours. The inside temperature was 180–185° C. and a pressure of 150 atmospheres was obtained. After cooling, the mixture was suspended in water, undissolved parts were shaken out with ether, the ether removed and the solution acidified with glacial acetic acid on the water bath. The precipitated acid dissolved in ethanol, the solution clarified with charcoal and the acid precipitated with water as pure white crystals. Yield about 45 grams.

In the same manner, 5-isobutyl-3-methyl-2-hydroxybenzoic acid was obtained from 4-isobutyl-2-methyl phenol.

The recovery and purification of streptomycin and dihydrostreptomycin from crude or impure solutions thereof by means of the present invention are carried out in either of the following ways:

(a) Precipitating the insoluble streptomycin or dihydrostreptomycin salts of the said acids by adding to the crude solutions concentrated solutions of water-soluble salts of the acids (if necessary, heat saturated solutions or even suspensions), extracting the separated precipitates with methanol or ethanol, the desired streptomycin or dihydrostreptomycin salts being dissolved while precipitated impurities remain undissolved, converting the salts dissolved in methanol into the water-soluble mineral acid salts of the antibiotics by reacting, for instance, with dilute sulfuric acid and finally precipitating the sulfate of streptomycin or dihydrostreptomycin, if necessary by increasing the concentration of alcohol; e. g., 1.285 grams (1/1000 mol) of the dihydrostreptomycin salt of p-cyclohexyl-o-cresotinic acid were dissolved in 20 ml. of methanol. To this solution there was then added 3.5 ml. of $N-H_2SO_4$, whereupon immediately a thick precipitate occurred which increased somewhat after the addition of a further 20 ml. of methanol. The precipitate was filtered by suction after standing for several hours in the cold, washed with methanol and dried. The yield amounted to 0.65 gram of pure dihydrostreptomycin sulfate.

(b) Precipitating streptomycin or dihydrostreptomycin in the form of insoluble salts as described in (a), suspending or dissolving the crude precipitates in water-insoluble alcohols like butanol, isobutanol or amyl alcohol, shaking with dilute sulfuric acid, separating the aqueous layer and precipitating the streptomycin or dihydrostreptomycin sulfate dissolved therein with methanol or ethanol; e. g., 2.41 grams (1/500 mol) of the dihydrostreptomycin salt of cyclohexyl-o-cresotinic acid was suspended in 20 ml. of amyl alcohol. To this suspension 1.4 ml. of N—$H_2SO_4$ and 5 ml. of water were added and the whole was well shaken. The aqueous layer was separated and the amyl alcohol layer was again washed with 5 ml. of dilute sulfuric acid. Upon precipitating the aqueous layer with methanol about 1.20 grams of pure dihydrostreptomycin sulfate was obtained.

I claim:

1. A difficulty water-soluble crystallized salt of a nuclearly substituted cresotinic acid and a substance selected from the group of consisting of streptomycin and dihydrostreptomycin, the said nuclearly substituted cresotinic acid having the formula

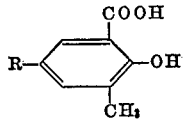

wherein R is selected from the group consisting of isobutyl and cyclohexyl.

2. A difficulty water-soluble crystallized salt of p-cyclohexyl-o-cresotinic acid and streptomycin.

3. A difficulty water-soluble crystallized salt of p-cyclohexyl-o-cresotinic acid and dihydrostreptomycin.

4. A difficulty water-soluble crystallized salt of p-isobutyl-o-cresotinic acid and dihydrostreptomycin.

5. A process for recovering and purifying a substance selected from the group consisting of streptomycin and dihydrostreptomycin from a crude solution thereof, which comprises adding to the crude solution of either of said substances a nuclearly substituted cresotinic acid having the formula of claim 1, extracting with a lower alcohol the precipitate which separates, adding a mineral acid to the alcoholic extract to convert the dissolved salt to the corresponding mineral acid salt and precipitating the mineral acid salt by increasing the concentration of alcohol.

6. A process according to claim 5 in which the mineral acid is sulfuric acid and the lower alcohol is methanol.

7. A process for recovering and purifying a substance selected from the group consisting of streptomycin and dihydrostreptomycin from a crude solution thereof, which comprises precipitating said substance with a nuclearly substituted cresotinic acid having the formula of claim 1, suspending the precipitate in a water-insoluble alcohol, shaking the alcoholic suspension with dilute sulfuric acid, separating the aqueous layer and precipitating the substance as sulfate.

References Cited in the file of this patent

UNITED STATES PATENTS

| | | |
|---|---|---|
| 2,618,645 | Bowles | Nov. 18, 1952 |
| 2,644,816 | Lott et al. | July 7, 1953 |
| 2,650,216 | Carboni et al. | Aug. 25, 1953 |